(12) United States Patent
Rydbom

(10) Patent No.: US 8,147,290 B2
(45) Date of Patent: Apr. 3, 2012

(54) GAME CALL STRIKER SHAPING RETAINER

(76) Inventor: Mark Edwin Rydbom, Meadville, PA (US)

( * ) Notice: Subject to any disclaimer, the term of this patent is extended or adjusted under 35 U.S.C. 154(b) by 682 days.

(21) Appl. No.: 12/228,823

(22) Filed: Aug. 15, 2008

(65) Prior Publication Data

US 2009/0053973 A1    Feb. 26, 2009

Related U.S. Application Data

(63) Continuation-in-part of application No. 10/939,081, filed on Sep. 10, 2004, now abandoned.

(60) Provisional application No. 60/506,830, filed on Sep. 26, 2003.

(51) Int. Cl.
    *A63H 5/00*    (2006.01)
(52) U.S. Cl. ....... 446/397; 446/418; 211/69.8; 211/70.6
(58) Field of Classification Search ............... 211/68, 211/70.8, 70.2, 69.1, 69.8, 69.9, 62, 63, 65, 211/66, 67, 70.7, 70.6, 60.1; 446/397, 418; 248/13, 229.26, 230.7, 231.81, 316.71
See application file for complete search history.

(56) References Cited

U.S. PATENT DOCUMENTS

| | | | | |
|---|---|---|---|---|
| 637,889 A * | 11/1899 | Parker | ............................ | 281/30 |
| 2,643,483 A * | 6/1953 | Walker | ........................... | 446/397 |
| 3,208,184 A * | 9/1965 | Wisor | ........................... | 446/397 |
| 4,941,858 A * | 7/1990 | Adams | ........................... | 446/397 |
| 5,484,066 A * | 1/1996 | Luisi | ........................... | 211/69.8 |
| 5,487,475 A * | 1/1996 | Knee | ........................... | 211/70.8 |
| 5,522,300 A * | 6/1996 | Cheatwood | .................... | 84/453 |
| 5,607,091 A * | 3/1997 | Musacchia | .................... | 224/222 |
| 5,678,348 A * | 10/1997 | Zielinski et al. | .................. | 43/26 |
| 6,010,389 A * | 1/2000 | Terll | ............................ | 446/404 |
| 6,092,675 A * | 7/2000 | Ramirez et al. | ................. | 211/68 |
| 6,149,492 A * | 11/2000 | Davis, Jr. | ...................... | 446/397 |
| 6,308,876 B1 * | 10/2001 | Havens | ......................... | 224/661 |
| 6,540,582 B1 * | 4/2003 | Primos et al. | ................. | 446/418 |
| 6,612,525 B2 * | 9/2003 | Bagdi | ............................ | 248/71 |
| 2006/0040583 A1 * | 2/2006 | Thompson | .................... | 446/418 |

* cited by examiner

*Primary Examiner* — Eugene L. Kim
*Assistant Examiner* — Urszula M Cegielnik

(57) ABSTRACT

A means of directly attaching one or more strikers of a slate type turkey call to that call. The attachment keeps the strikers and call as a unit for ready access and eliminates one rattling against the other when the call is not in use. The attachment is accomplished by diametral engagement of the strikers by an extension of the call body. The extension is an integral part of the call body or added as an accessary to an existing slate turkey call. Providing accurate diametral location, the invention is also used, with abrasive material, to effectively shape or resurface the sound producing end of the striker.

4 Claims, 6 Drawing Sheets

GAME CALL STRIKER SHAPING RETAINER

CROSS-REFERENCE AND PRIORITY CLAIM TO RELATED APPLICATIONS

To the full extent permitted by law the present application claims priority to and the benefit of the following applications: (1) as a continuation-in-part application to non-provisional utility application entitled "GAME CALL STRIKER RETAINER", Ser. No. 10/939,081, filed Sep. 10, 2004, now abandoned, which claims priority to and the benefit of Provisional Application No. 60/506,830 filed Sep. 26, 2003, entitled "GAME CALL STRIKER RETAINER".

TECHNICAL FIELD

The present invention relates to hunting turkey with the use of calls and more specifically to using what is commonly called a slate call. The present invention is used to attach the sound producing striker to the pan of the call, when not in use, and to shape and resurface the sound producing end of the striker.

BACKGROUND OF THE INVENTION

This invention relates to turkey hunting using a planar friction type call, commonly referred to as a slate call. Slate call comes from what these calls originally used as the sound producing striking surface, although now this surface can be slate or a number of other materials both natural and synthetic. These calls usually have the shape of a shallow cup 20 three to four inches in diameter that is made of plastic or wood. The cup 20, sometimes referred to as the pan of the call, is covered by the sound producing striking surface 21 with holes 22 in the bottom or sides of the cup that emit the sound. FIG. 3 shows the top and bottom of this type of call in its common form.

In order to imitate the sound of a wild turkey, the striking surface is scratched or rubbed with an object commonly called a striker 23 or peg. Like the striking surface of the call, these strikers can be made from a variety of materials, with various types of wood being the most common. Strikers are usually cylindrical in shape at the striking end, and are usually held by the fingers much like a pencil. FIG. 3 shows a typical striker 23. FIG. 2 shows a typical striker 23 in a calling position against the sound producing surface 21 of the call.

To enhance the frictional characteristics, the sound producing surface of the call is often prepared with abrasive material such as sand paper. This is always done to a traditional slate surface, but also to other common surface materials. Knowledgeable hunters also prepare the sound producing end of the striker by abrasion. Through extensive practice and calling, strikers tend to wear deformities on the normally radiused or partial spherical shaped end of the striker. Although tedious, the spherical shape can be restored by abrasion. This also opens and cleans the grain of wooden strikers, enhancing the frictional characteristics and quality of the sound produced by a striker.

Turkey hunters have found that they sometimes get a better response to their calling if it sounds like there is more than one turkey at the location from which they are calling. This can be accomplished with one planar friction call by carrying a number of strikers made from different materials and of various shapes and sizes. Different strikers sound different against the same striking surface, sounding like a different turkey.

Eliminating unnatural sounds is very important when turkey hunting, since turkey will quickly flee if they hear a sound that is not natural to their environment. Rattling sound made by hunting gear moving around in a hunter's pocket is one of these unnatural sounds that needs to be eliminated to effectively hunt the wild turkey. Ideally a slate call and its striker should be kept together for ready access, but unless some sort of separator for the two is fashioned, or they are kept in separate pockets, unwanted rattling occurs.

A common link between a slate call and a striker up to this point has been a lanyard. It is nothing more than a thin rope that is looped and knotted between holes in the call and striker. The lanyard requires enough length to enable striker use while still tied to the call. Not all call manufacturers supply holes to accommodate a lanyard, and striker rattling against the call is still a problem since they have to be transported together. Sporting goods manufacturers also make pouches to carry a slate call and strikers. These are usually a pocket to place the call in, covered by a flap held down with a snap, button or velcro, and have fabric or elastic loops on the outside to hold strikers. Hunting vests are also available with special pockets designed specifically for slate calls, with fabric or elastic loops for holding strikers.

Resilient clips or clasps are used to hold a wide variety of objects that have a round shape. These utilitarian devices usually have a profile that is mostly C-shaped with deflective legs and an internal partial diameter the size of the retained object. Often called spring clips, variations of these clips have been made of spring steel, rubber, wood, plastic and other materials, with the resilience of plastic making it popular for this application. Combinations of materials have also been used with success, utilizing mechanical properties of more than one material when needed. Uses of these resilient clips are numerous. Some uses in sporting goods are golf ball holders, golf club holders, tennis ball holders, hunting arrow quivers and firearm cartridge carriers. They are widely used in the medical industry, plumbing and in electrical as both a retainer and a conductor of electricity. Anywhere a round profile needs to be securely held, either temporarily or permanently, some variation of a resilient diametral clip might be used.

SUMMARY OF THE INVENTION

The present invention uses a diametral fastening means to directly attach the striker of a slate type turkey call to that call. This fastening means firmly attaches the striker to the hunter's call. This fastening means keeps the striker and call as a unit for ready access and eliminates the possibility of one rattling against the other when the call is not in use. The invention also attaches more than one striker to a call. By providing accurate diametral location, the innovative striker retainer is also used to effectively shape or surface the sound producing end of the striker it retains.

BRIEF DESCRIPTIONS OF THE PERSPECTIVE DRAWINGS

Figure 4:
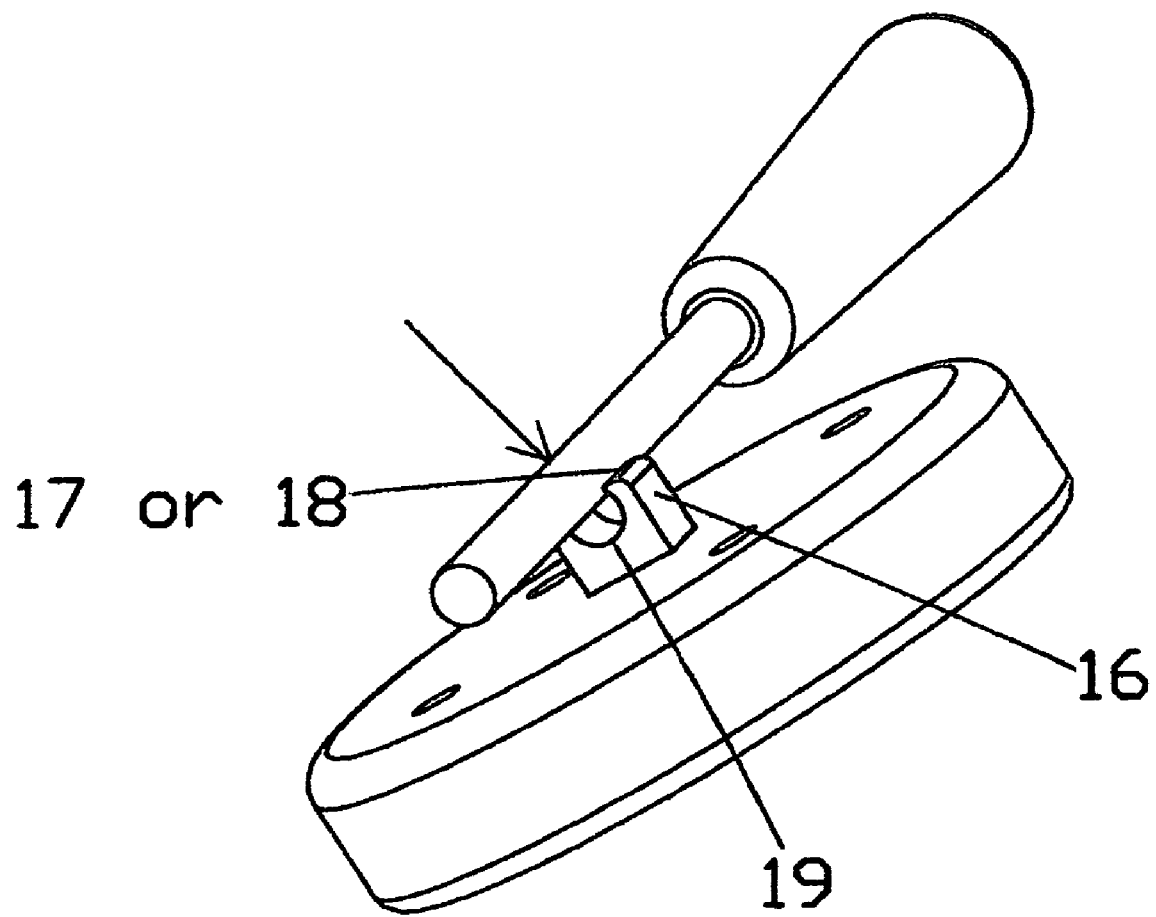

FIG. 4 demonstrates engagement of a striker by a retainer.

Figure 5:
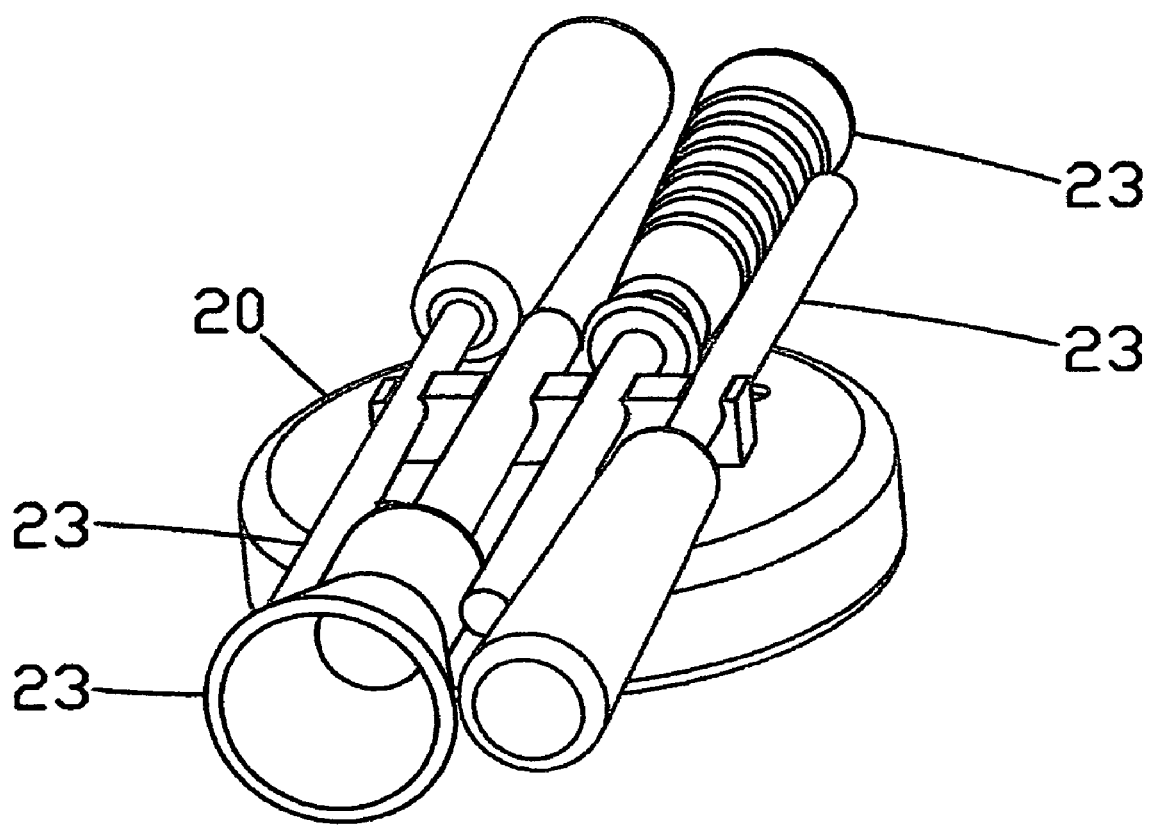

FIG. 5 shows a call with a retainer on the bottom retaining four strikers.

Figure 6:
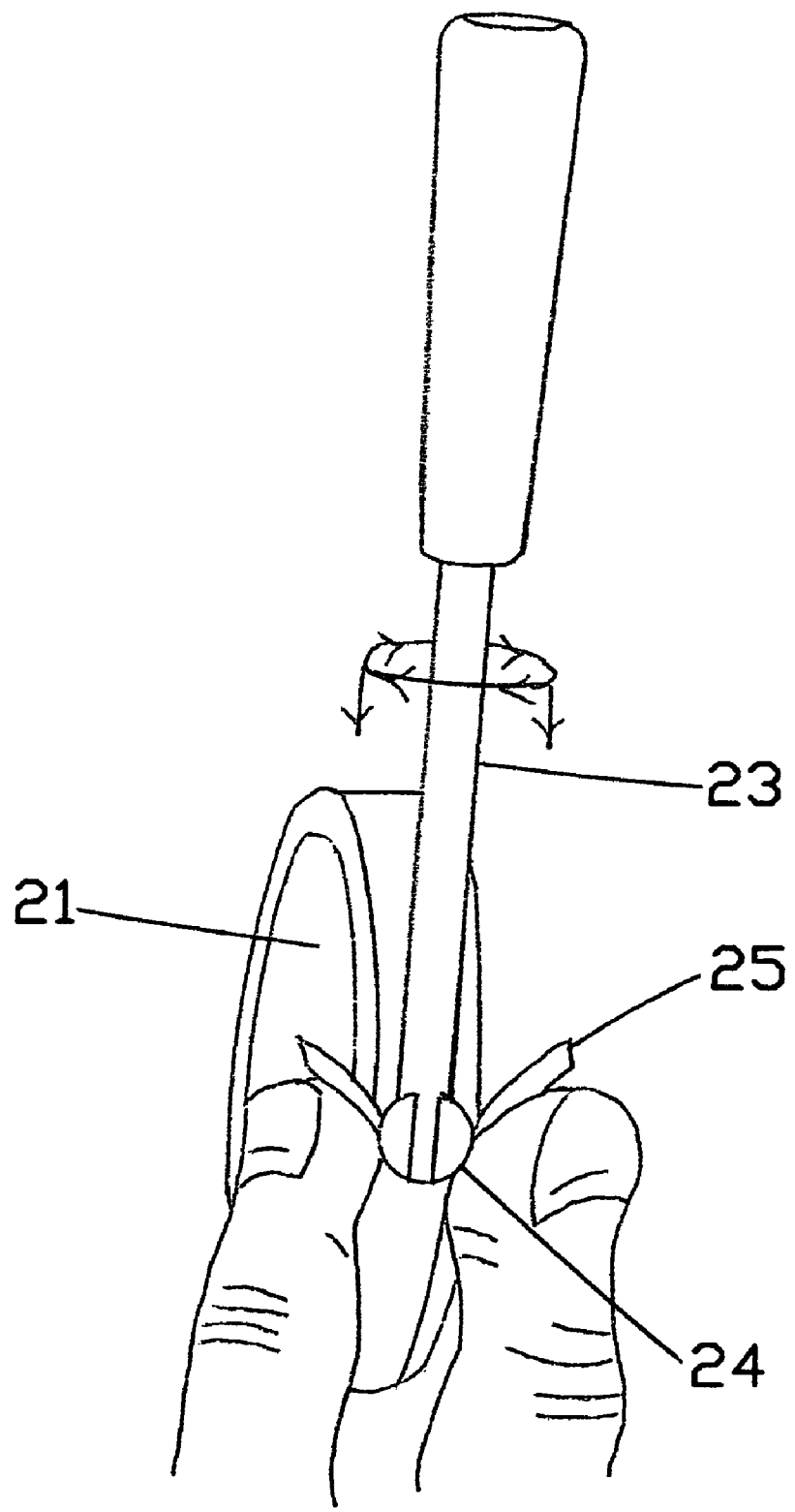

FIG. 6 demonstrates the shaping or surfacing of a striker end, with abrasive material, while engaged by the retainer.

DESCRIPTION OF THE INVENTION

Figure 1:
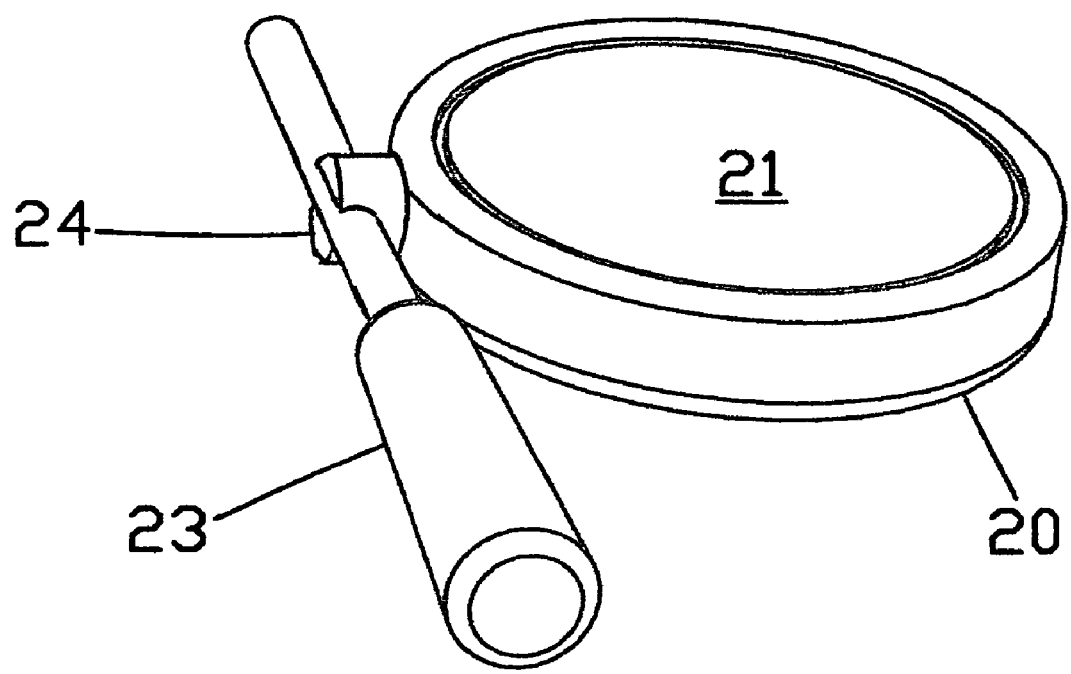
FIG. 1 shows the preferred embodiment with integral retainer and a striker retained.
Figure 2:
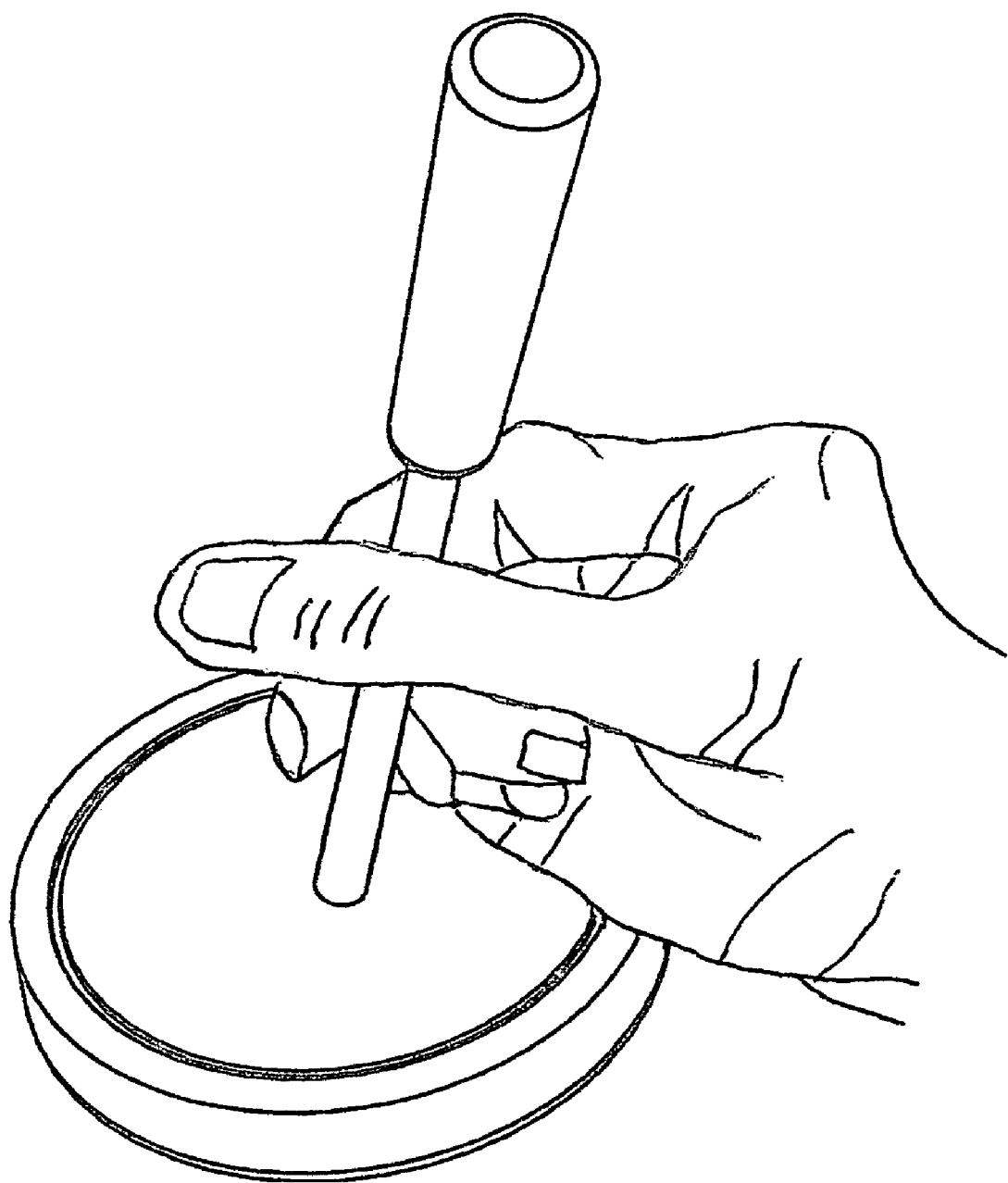
FIG. 2 shows the bottom and top of a common slate turkey call and a striker.
Figure 3:
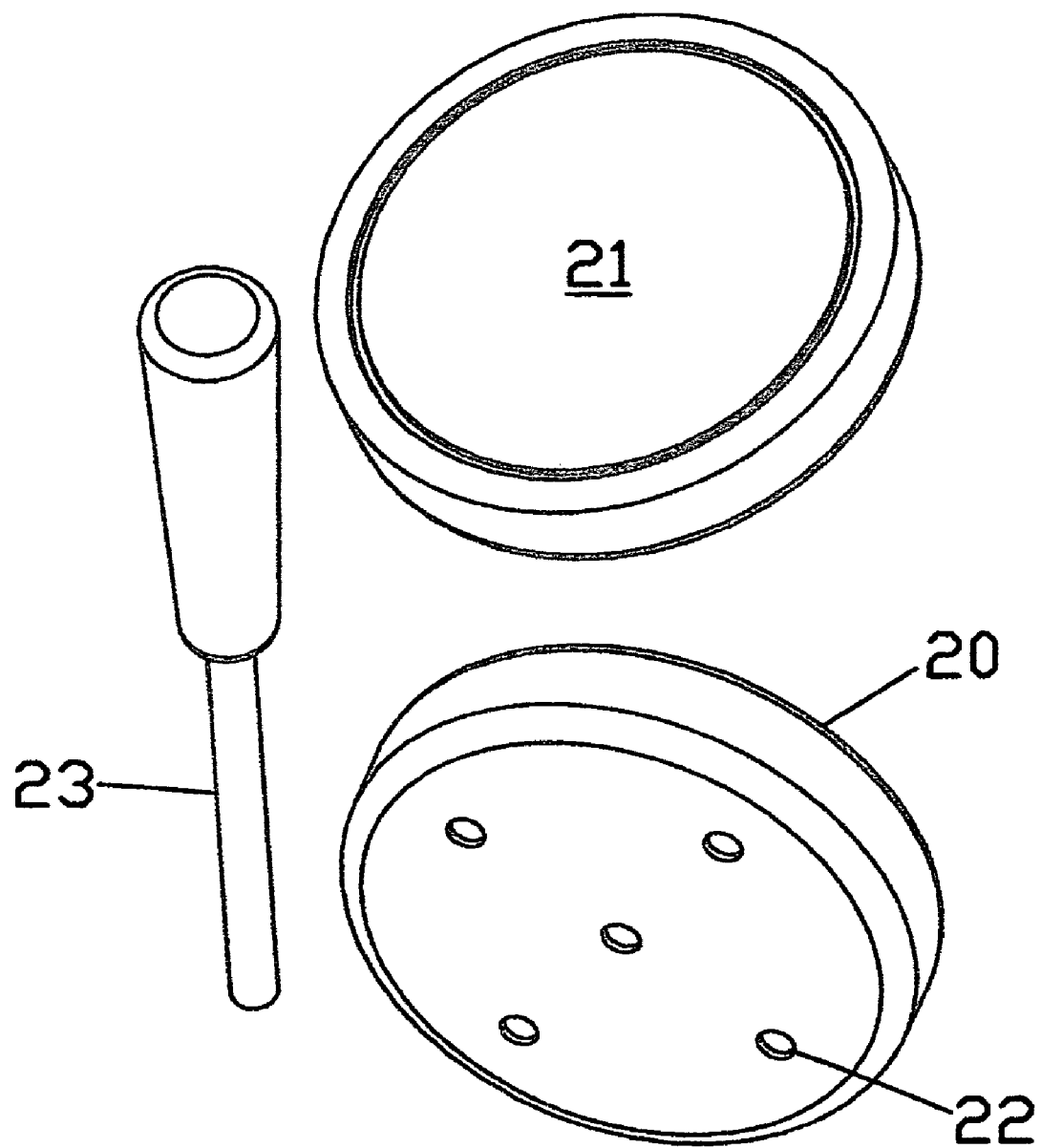
FIG. 3 shows a striker against a slate call in calling position.

The preferred embodiment of the present invention makes use of a C-shaped clip that is either an integral part of the slate turkey call body or is somehow attached to the body of the call. This clip diametrally engages the striker for quiet transport of the call and striker as a unit. FIG. 1 shows a typical call with an integral clip 24 with a striker 23 engaged, ready for quiet transport.

The preferred embodiment of the present invention would be injection molded of a resilient polymeric material able to withstand the deforming of the two legs 16 of the C-shaped profile to engage the striker diameter. The internal partial diameter 19 of this profile will be slightly smaller than the striker diameter it will retain. The opening of the profile that receives said striker will be approximately 50-80% of the retained diameter of said striker 23, with a small tangential radii 17 or chamfer angle 18 along each side of said opening to promote entry of the striker. The profile length will provide required rigidity, or can be of divided construction with multiple, axially aligned, C-shaped profiles for rigidity and material savings. The clip and striker are engaged by axially aligning the striker diameter parallel with the internal clip diameter 19 along the opening in the clip. See FIG. 4. Pushing the striker perpendicular to said axes, the two legs 16 of the clip are deformed or deflected, allowing the striker to enter the clip. The striker is pushed until stopped by the internal diameter 19 of the clip, aligning the centerlines of the two diameters. At this point the two legs 16 of the clip have returned nearly to their original shape and position and are now retaining the striker. Reversing this procedure removes the striker from the retainer.

The preferred embodiment of the present invention would have the call body, or pan, injection molded of polymeric material with the inventive clip being an integrally molded extension of the main call body. The integrally molded clip 24 could be anywhere on the call that does not inhibit function, such as on the side of the pan or anywhere on the bottom.

The preferred embodiment of the present invention would have a round or radiused profile axially central and perpendicular to the central axis of the internal partial diameter of the C-shaped profile This round profile will facilitate the striker resurfacing function of the retainer. Abrasive material 25 will be wrapped against the round profile covering the opening in the C-shaped profile. This will resurface the end of the striker when the striker is revolved in the diametrally engaged position, while gently pushing the sound producing end in contact with the abrasive material. See FIG. 6. This accurately shapes the rounded end of the striker or removes any flats or deformities generated by use. It also opens and cleans the grain on wooden strikers, enhancing the call sound. This procedure will also be used to resurface a non-rounded sound producing end, found on some strikers. A number of strikers on the market are of tubular form on the sound producing end. These strikers can be reshaped square and true with the abrasive material held against a flat sided retainer profile that is perpendicular to the internal partial diameter that retains the striker.

Another embodiment of the present invention would have the inventive clip attached as an accessary to an existing planar friction call. This could be accomplished with any form of a one way push-in mounting stud, a common screw, rivet or by any other functional means.

Yet another embodiment of the present invention could handle multiple strikers. FIG. 5 shows a slate call holding four strikers. The clips that retain multiple strikers could be integrally molded or attached as an accessory to an existing call.

The striker retainer could also be made of other materials like die formed metal, rubber, wood or any combination of materials, without departing from the spirit and scope of the invention. The retainer could also take forms other than the C-shaped clip without departing from the spirit and scope of the present invention. For example, functional attachment and shaping of strikers could also be obtained with other forms of diametral engagement such as a closed loop.

The striker shaping retainer offers the convenience of keeping the striker and slate call as a unit when not in use calling turkey. The innovative shaping function of the retainer lets the hunter quickly and accurately shape or resurface the sound producing end of the striker. This can be done with the same abrasive material used to prepare the striking surface of the call.

What is claimed is:

1. A diametral retainer for removably fastening elongate game call strikers in combination with a slate type, pan or pot friction turkey call comprising the retainer being made of resilient material and having a C-shaped profile portion, the C-shaped profile portion having a pair of deflective legs; the C-shaped profile having a striker opening to an internal partial diameter, the opening being 50% to 80% of the internal partial diameter; the C-shaped profile having a bottom base portion; the slate type friction call having a round outer peripheral portion; the bottom base portion of the C-shaped profile portion being attached to the call outer peripheral portion pan or pot; a striker having an elongated proximal portion and a partially spherical or flat distal end, having a distal end diameter; the internal partial diameter of the C-shaped profile portion being axially coincident with the distal end diameter of the retained striker; the internal partial diameter of the C-shaped profile portion being slightly smaller than the distal end diameter of the retained striker; the axial center of the internal partial diameter and the retained striker being perpendicular to the axial center of the round pan or pot of the call; abrasive material hand-held externally against the combination C-shaped profile portion and the sounding, distal end of the retained striker for shaping by rotating while pushing the retained striker against the abrasive material.

2. A diametral retainer for removably fastening the strikers of a round, pan or pot, slate type friction turkey call to the exterior of the pan, according to claim 1, wherein the retainer is a properly sized and spaced configuration of axially parallel internal partial diameters, to retain a plurality of specific strikers.

3. A diametral retainer for removably fastening the strikers of a round, pan or pot, slate type friction turkey call to the exterior of the pan, according to claim 1, wherein the retainer is an integrally molded projection of a molded pan or pot.

4. A diametral retainer for removably fastening the strikers of a round, pan or pot, slate type friction turkey call to the exterior of the pan, according to claim 1, wherein the retainer is an added attachment, by mechanical or adhesive, to a pre-manufactured pan.

* * * * *